United States Patent
Artman et al.

(10) Patent No.: US 7,493,235 B2
(45) Date of Patent: Feb. 17, 2009

(54) SYSTEM AND METHOD FOR DYNAMIC GENERATION OF ENVIRONMENTAL OPERATIONAL MODELS

(75) Inventors: Paul T. Artman, Austin, TX (US); David L. Moss, Austin, TX (US); Weijia Zhang, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 11/621,333

(22) Filed: Jan. 9, 2007

(65) Prior Publication Data

US 2008/0167848 A1    Jul. 10, 2008

(51) Int. Cl.
   *G01F 17/50*   (2006.01)
   *G06F 17/10*   (2006.01)
(52) U.S. Cl. ............... 702/182; 702/183; 702/184; 703/1; 703/2; 705/75; 705/78
(58) Field of Classification Search ......... 702/182–184, 702/185; 703/1–2; 236/78, 94; 700/276, 700/277, 278, 29–31, 129; 705/75, 76, 78
See application file for complete search history.

(56) References Cited

U.S. PATENT DOCUMENTS

| 6,945,058 B2 | 9/2005 | Bash et al. | |
| 7,209,869 B1 * | 4/2007 | Kroger et al. | 703/1 |
| 2003/0115024 A1 | 6/2003 | Snevely | |
| 2005/0267639 A1 | 12/2005 | Sharma et al. | |
| 2007/0078635 A1 * | 4/2007 | Rasmussen et al. | 703/1 |

FOREIGN PATENT DOCUMENTS

| GB | 2411529 A | 8/2005 |
| WO | 2006119248 A3 | 11/2006 |

OTHER PUBLICATIONS

Lee et al., "Application of a Computational Fluid Dynamics Tool for System Level Thermal Simulation" Dec. 1994, IEEE, Part A—vol. 17, No. 4.*
Skipper, G.C. "Remote Technology Builds An Information Network" Aug. 1, 2006, Construction Equipment.*
UK Intellectual Property Office Search Report, May 1, 2008, pp. 1-8.

* cited by examiner

*Primary Examiner*—Tung S Lau
*Assistant Examiner*—Sujoy K Kundu

(57) ABSTRACT

A system and method for system and method for dynamic generation of environmental operational models is disclosed. In one form, an information handling system can include a planning tool operable to enable selection of a system for use at a site. The information handling system can also include a thermal management processor operably coupled to the planning tool. The thermal management processor can include an input operable receive an attribute of a component of the system, and an output operable to output information that can be used to determine a CFD analysis. The thermal management processor can further include a CFD analysis input source operable to receive a CFD analysis to be presented in connection with the planning tool.

20 Claims, 3 Drawing Sheets

SYSTEM AND METHOD FOR DYNAMIC GENERATION OF ENVIRONMENTAL OPERATIONAL MODELS

FIELD OF THE DISCLOSURE

This disclosure relates generally to information handling systems and more particularly to a system and method for dynamic generation of environmental operational models.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various information handling systems can be realized as servers that can be mounted within server racks. Servers can allow accessing and serving information, applications, and various types of data to multiple clients via an Intranet, the Internet, or combinations thereof. Managing servers, and server configurations, has historically been accomplished by system administrators accessing terminals connected to servers. For example, a system administrator could modify software, hardware, and other configurations for one or more servers. Recent developments in server management technology include providing remote management applications that allow system administrators to remotely monitor and access server software, hardware, power management, and various other associated components. However, the complexity and density of servers and associated components provided within server racks for some enterprise data centers impacts environmental and operating conditions of servers within data centers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
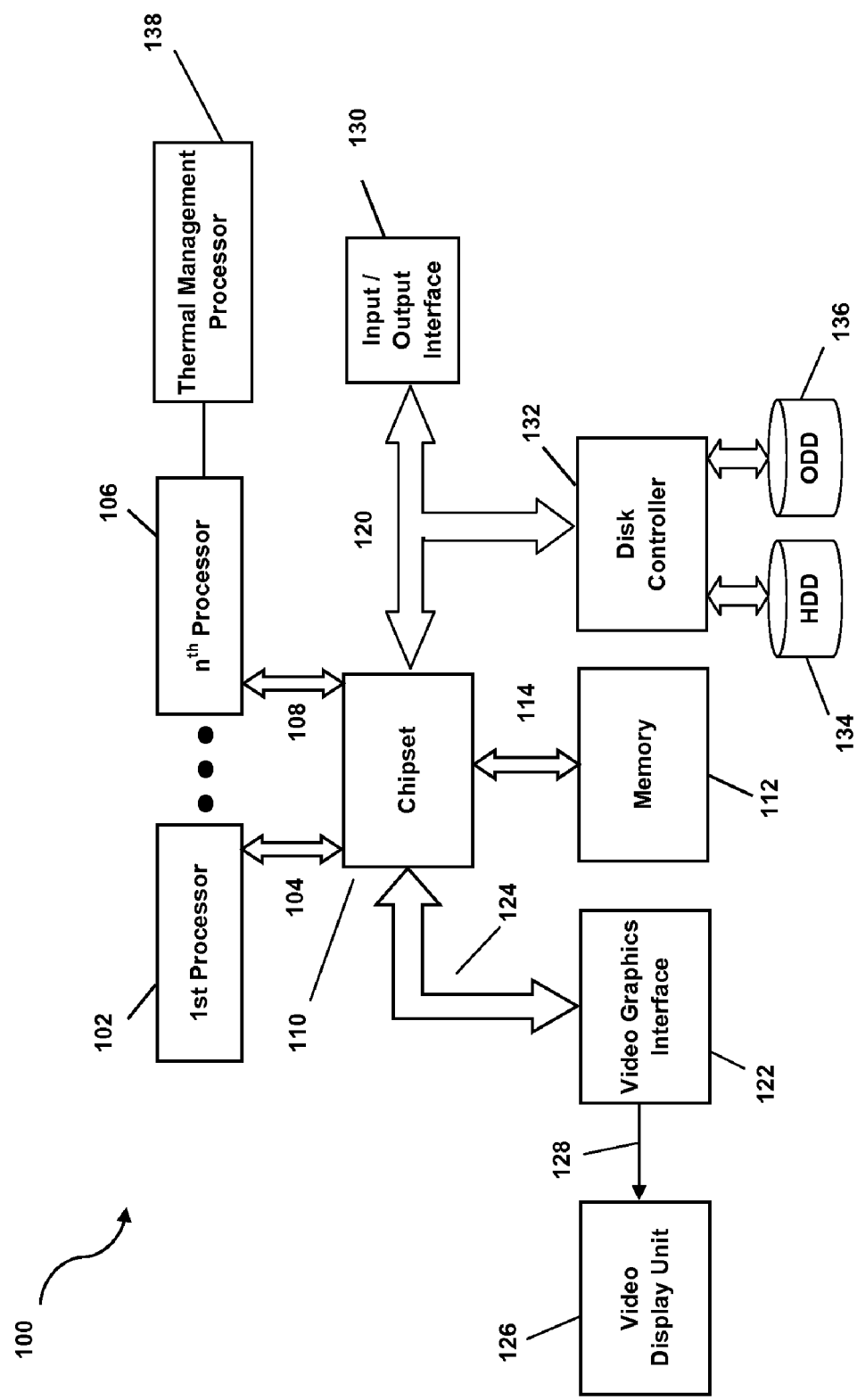
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices, as well as various input and output (I/O) devices, such as a keyboard, a mouse, and a video display. The information handling system can also include one or more buses operable to transmit communications between the various hardware components.

According to one aspect of the disclosure, a method of determining environmental operating conditions for an information handling system is disclosed. The method can include accessing configuration information of a system to be used at a site and generating a first thermal information output using the configuration information. The method can further include using the first thermal information output to determine an environmental operational analysis.

According to a further aspect of the disclosure, an environmental operational analysis enabled ordering system can include a thermal attribute source operably associated with an order system source. The environmental operational analysis enabled ordering system can also include a thermal management processor operable to receive an input from a power consumption application and an environmental operational modeling source. The thermal management processor can be further operable to output a representation of an environmental operational analysis.

According to a particular embodiment of the disclosure, an information handling system can include a planning tool operable to enable selection of a system for use at a site. The information handling system can also include a thermal management processor operably coupled to the planning tool. The thermal management processor can include an input operable to receive an attribute of a component selected in connection with using the planning tool, and an output operable to output information that can be used to determine a CFD analysis. The thermal management processor can further include a CFD analysis input source operable to receive a CFD analysis to be presented in connection with the planning tool.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110 including an AHA enabled-chipset can include a memory controller hub and an I/O controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset also that can include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as ISA, SCSI, I2C, SPI, or USB buses.

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and Industry Standard Architecture (ISA) I/O for the information handling system 100.

The information handling system 100 can further include a disk controller 132 coupled to the I/O bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive.

The information handling system 100 can also include the thermal management processor 138 operable to output a representation of an environmental operational analysis in connection with a component, device, system, etc. having one or more attributes that can be used to calculate an expected thermal output. The thermal management processor 138 can be provided as a processor, a software application, within firmware, or any other type of medium operable to provide the thermal management processor 138. Additionally, one or more inputs and outputs can be used by the information handling system 100 in connection with using the thermal management processor 138. According to one aspect, one or more attributes for one or more of the components can be stored within a local or remote database accessible by the information handling system 100. For example, attributes can be stored within HDD 134. However, in other embodiments, attributes can be accessed using the I/O interface 130 coupled to a network such as an Intranet, the Internet, or other networks that can provide access to information that can be used by the information handling system. According to another aspect, the thermal management processor 138 can be stored as an application remote to the information handling system 100 and can be accessed as desired. In one form, one or more portions of the thermal management processor 138 provided as an application can be stored within a memory or other storage device of the information handling system 100 and accessed as desired.

During operation, the information handling system 100 can access device or component attributes to determine environmental operational analysis for a device, component, server, rack, or any combination thereof. In one form, the environmental operational analysis can also include a computation fluid dynamic (CFD) analysis. For example, the thermal management processor 138 can be employed by the information handling system 100 and portions, or all of the thermal management processor 138 can be used to output a CFD analysis. According to one aspect, an environmental operational analysis can include an analysis of an expected power consumption, thermal dissipation, conditional geometric boundary factor, or various other factors that can influence an environmental operational of a system or site using one or more components, devices, servers, information handling systems, server or blade racks, or any other element that can impact or influence an environment. For example, a site can include an information handling system including one or more servers, server racks and enclosures, chassis components, fans, vents, and various other sources that can impact an operating environment. As such, the thermal management processor 138 can access attributes for each component of a system, and output an environmental operational analysis for the system. In this manner, a user can use the environmental operational analysis for various purposes including, site management of systems, managing environmental needs for sites, determining an impact of systems to be purchased, mapping purchase orders to an existing site, or various other applications or uses that can benefit from the environmental operational analysis.

Figure 2:
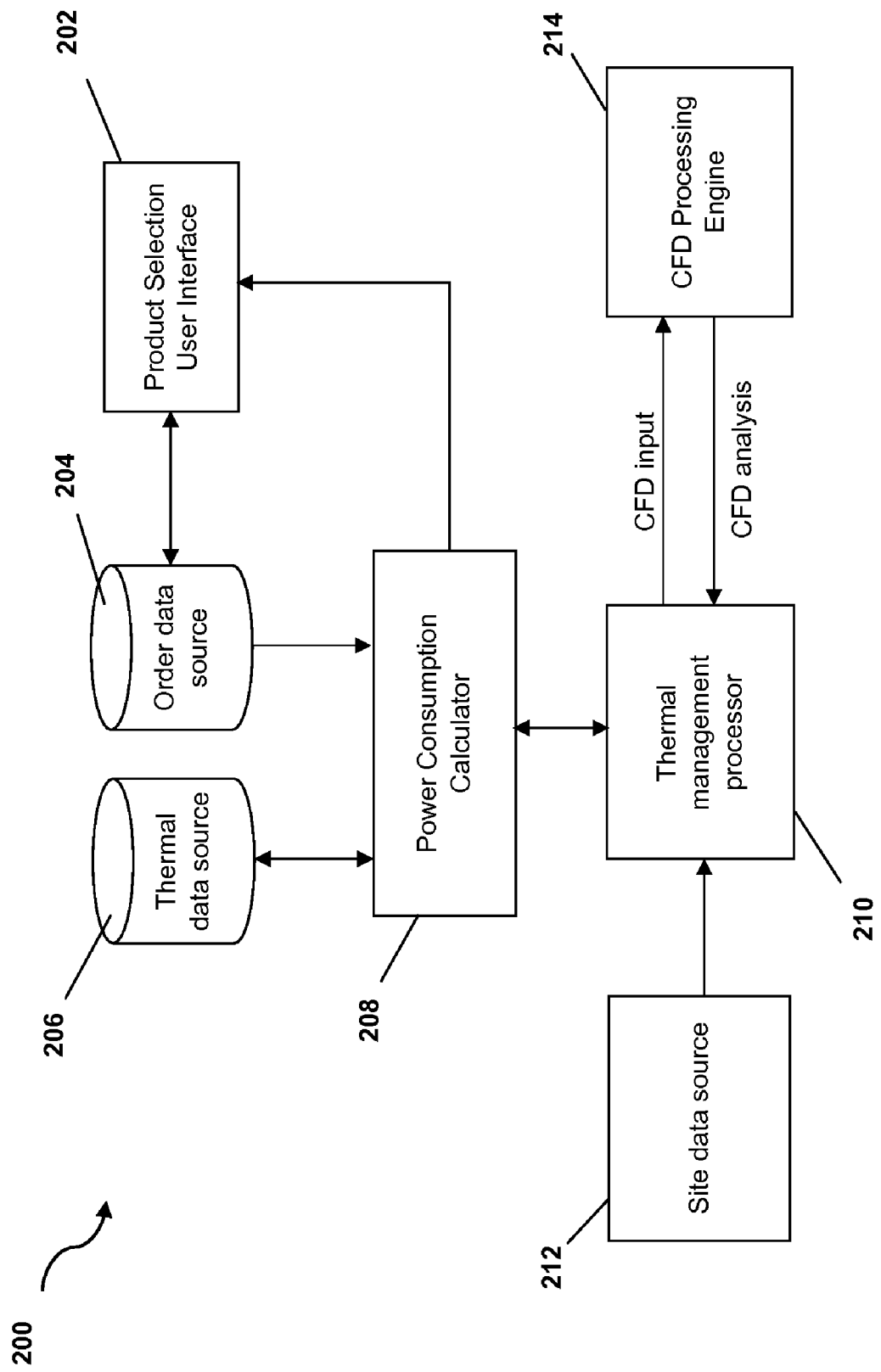
FIG. 2 illustrates a functional block diagram of an environmental operational analysis enabled ordering system according to another aspect of the disclosure.

FIG. 2 illustrates a functional block diagram of a environmental operational analysis enabled order system, depicted generally as system 200, can be operable to output an environmental operational analysis based on attributes of a system to be purchased or ordered. The system 200 can be employed, in whole or in part, by the information handling system 100 illustrated in FIG. 1, or any other type of system than can be used to provide the system 200.

The system 200 can include a product selection user interface 202 operably coupled to an information source such as an order data source 204 operable to store information for purchase orders of servers, systems, devices, components, or any other type of product that may be selected for use by an end user. The system 200 can further include a thermal information sources such as a thermal data source 206 operable to provide thermal information, attributes, descriptors, or various other forms of data or information for products that can be purchased. The thermal data source 206 and the ordering system source 204 can be provided as separate information or data sources however, in other embodiments, can be combined as a single data source.

The system 200 can also include a power consumption calculator 208 operably coupled to the thermal data source 206 and the order data source 204. The power consumption calculator 208 can also be coupled to a product selection user interface 202 to output power consumption estimates for products to be purchased. The system 200 can also include a thermal management processor 210 coupled to the power consumption calculator 208. In one form, the thermal management processor 210 can receive an input from a site information source such as site data source 212. For example, the site data source 212 can include an end system data source, site management data source, a data center integration source, or any other type of source or application that can provide an input to the thermal management processor 210. The thermal management processor 210 can also be coupled to a CFD processing engine 214 operable to generate environmental operational analysis such as CFD models or analysis based on an input from the thermal management processor 210. For example, the CFD processing engine 214 can receive a CFD input from the thermal management processor 210, and the CFD processing engine 214 can output a CFD analysis to the thermal management processor 210. The CFD processing engine 214 can be provided as an application external to the system 200. In another form, the CFD processing engine 214 can be provided as a separate application operable to employ the CFD input provided by the thermal management processor 210. For example, the system 200 can be used in association with various third party CFD modeling applications, including, but not limited to, applications provided by Flovent, Tileflow, Airpak, or others.

During operation, a user can select a component, system, server, or various other products, or any combination thereof, using the product selection user interface 202. For example, the order data source 204 can present one or more products via a planning tool, an on-line catalogue, or any other type of user interface that can be used to select products. In one form, the order data source 204 can maintain a list of products that can be selected. The order data source 204 can include attributes for one or more components that are associated with a product to be purchased. For example, the order data source 204 can include attribute data for various types of servers, and associated components, used to provide a specific type of server. One or more attributes of components to be provided with a purchase can be stored by the order data source 204 communicated to the power consumption calculator 208. Additionally, the power consumption calculator 208 can access the thermal data source 206 and determine one or more thermal attributes for a component. Thermal attributes can include various types of descriptive information for specific components associated with products to be purchased. Attributes and thermal attributes can include various types of information that can be used to determine an environmental operational analysis including, but not limited to, power, thermal limits, airflow magnitude and direction, geometric or dimensional information such as length, width, height, weight, etc. Attributes can also include information on availability and type of cooling for a system, relative placement of components within a system, and various other configuration data.

In one form, the power consumption calculator 208 can be accessed via a planning tool that can be accessed by a user using the product selection user interface 202 or other associated interface for purchasing a product. Upon a user accessing the power consumption calculator 208, the thermal data source 206 can provide thermal attributes to the power consumption calculator 208, and the power consumption calculator 208 can estimate power consumption for a product to be purchased.

In one form, the system 200 can employ the thermal management processor 210 to determine a CFD analysis for a product to be purchased. For example, the thermal management processor 210 can receive a thermal data output from the power consumption calculator 208. The thermal management processor 210 can generate an output that can be coupled to the CFD processing engine 214 to determine a CFD analysis for the products to purchase. For example, one or more attributes can be input to the thermal management processor 210 from the thermal data source 206, the order data source 204, the power consumption calculator 208, or any combination thereof. In one form, the thermal management processor 210 can access the power consumption calculator 208 to determine a thermal output for one or more of the products to be purchased. However, in other forms, the thermal management processor 210 can include a power consumption calculator operable to determine thermal output. In one form, a user may select a system or product to order, such as a blade server that can be installed within an existing rack, and operable to be used in a high capacity database management application. As such, the system 200 can be used to allow a user to select site-specific product information, or an application specific use for a product to be purchased. Attributes can then be determined using the order data source 204 and the thermal data source 206 for determining an environmental operational analysis.

Upon determining a thermal output for a product, or group of products to be purchased, the thermal management processor 210 can produce an output that can be used by the CFD processing engine 214. For example, the CFD input produced by the thermal management processor 210 can be formatted as a "pdml" file type, a "vrml" file type, an "xml" file type, or various other file types that can be used by the CFD processing engine 214. In one form, the CFD input can be selectable by the end user as desired prior to producing the CFD input. As such, the CFD input can be generated based on a type of application that may be used to provide a CFD analysis or model. In another form, the CFD input can be provided as a file that can be input by the end user to the CFD processing engine 214.

According to one aspect, the thermal management processor 210 can receive an input from a source operable to provide attributes or other data describing an end user site or data center. For example a site data source 212 can be input to the thermal management processor 210 in association with purchasing a product. In one form, the site data source 212 can include an integration resource operable to translate attributes describing systems and components that may already be in place at an end user site. For example, an end user's site can include a data center having numerous server racks, servers and associated components or resources, relative placement of components, form factors, heating and cooling requirements or availability, humidity control for a site, available space, or various other types of environmental operating conditions to describe a site. Additionally, the site can include various types of servers or systems that may be provided by numerous manufacturers, vendors, companies, etc. The thermal management processor 210 can receive attributes for the site and convert the attributes, if desired, to a desirable format. As such, the site data source 212 can provide attributes for a site and input the attributes to the thermal management processor 210. In one form, the site attributes can be combined with the attributes of a system to be purchased or ordered. In one form, the attributes can be combined by the thermal management processor 210. The thermal management processor 210 can determine a thermal output for the combined data or information and communicate a CFD input to the CFD processing engine 214. In one form, the power consumption calculator 208 can determine a thermal output of the combined data and the thermal management processor 210 can provide the CFD output based on the combined data. According to another aspect, the power consumption calculator 208 can determine a thermal output separately and input the thermal output for the site attributes and the purchase order to the thermal management processor 210.

Upon determining thermal outputs, the thermal management processor 210 can provide a CFD input to the CFD processing engine 214. The CFD processing engine 214 can simulate an environmental operational impact, such as a CFD model using the CFD input. For example, the CFD simulation can include determining an environmental impact a product, or group of products, may have on a site.

Upon determining a CFD analysis or model, the CFD processing engine 214 can provide an output. In one form, the CFD analysis output can be directly coupled to the thermal management processor 210. However, in other embodiments, the thermal management processor 210 can receive the CFD simulated results as a separate file. In one form, a CFD analysis output can include a mapping of air temperature predictions, such as the inlet temperature associated with each server or system. Various other predictors can also be mapped and provided in association with a CFD analysis output. Upon receiving the CFD analysis, the results can be presented to the user using the power consumption calculator 208 and the product selection user interface 202. In another embodiment, the CFD analysis can be presented using various other output formats or user interfaces as desired. In this manner, the system 200 can be used to determine an environmental impact that may be placed on an end user's operating environment prior to an end user purchasing a product or group of products. Additionally, an end user's site or data center can be also modeled using the attributes of products to be purchased. In this manner, a new site configuration can be determined for the products to be purchased and a dynamic generation of CFD analyses or models can be obtained during the planning stages of an end user site or data center.

In one form, the power consumption calculator 208, the thermal management processor 210, the CFD processing engine 214, or any combination thereof, can be provided within the same application, process, processor, or can be provided separately. Additionally, the thermal data source and order data source 204 can be provided as separate databases or data sources. However, in other embodiments, the thermal data source 206 and the order data source 204 can be provided within the same database, data source, etc. as desired.

In another form, the CFD analysis can be provided in association with the power consumption calculator 208. However, in other embodiments, the user can be presented the results using various other types of applications, user interfaces, etc. and the system 200 should not be limited to presenting the CFD analysis using the power consumption calculator 208, the product selection user interface 202, or other specific component of the system 200.

Figure 3:
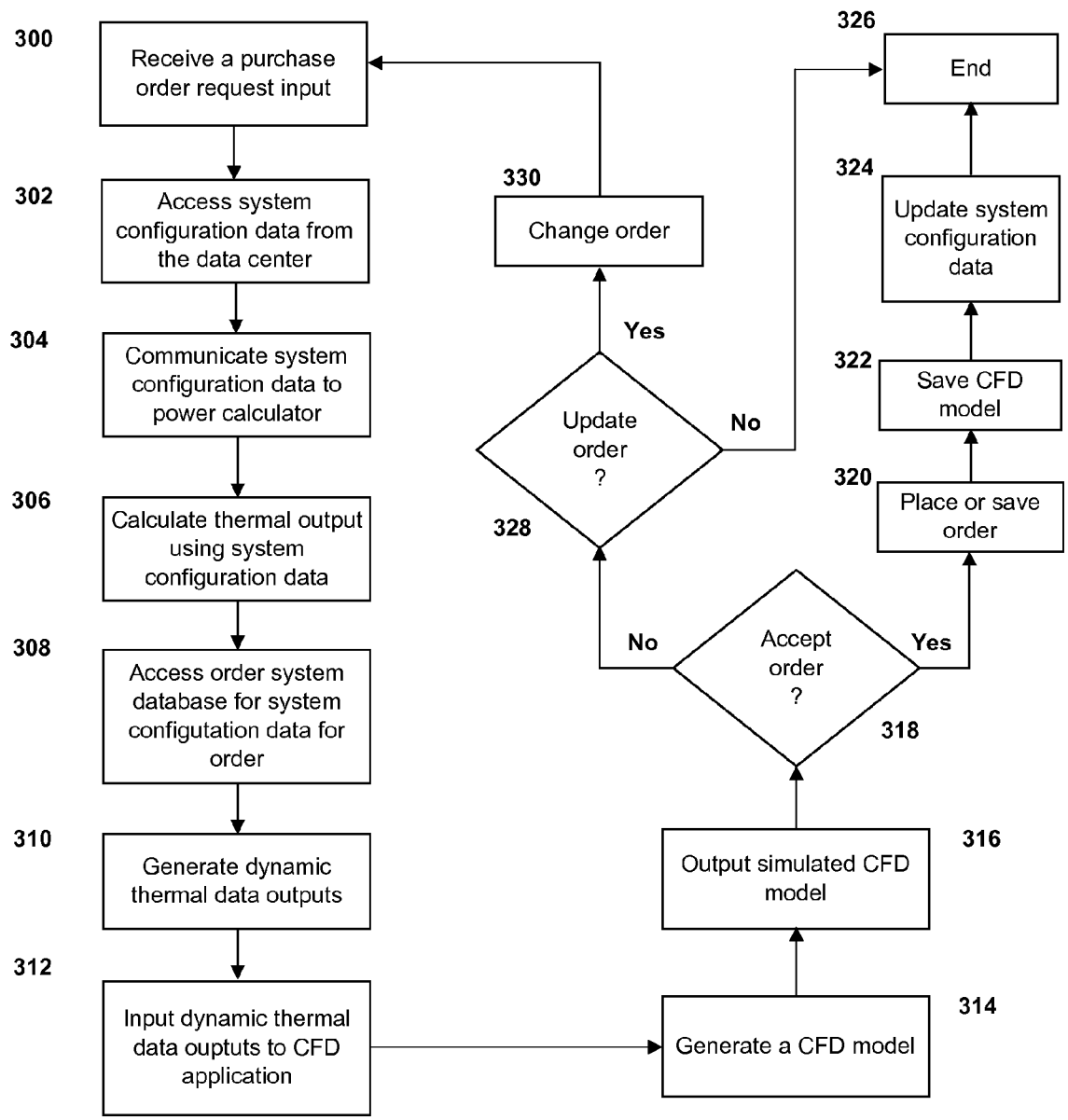
FIG. 3 illustrates a flow diagram of a method for generating environmental operational analysis outputs according to a one aspect of the disclosure.

FIG. 3 illustrates a flow diagram of a method for generating CFD models. The method of FIG. 3 can be employed in whole or in part by the information handling system 100 depicted in FIG. 1, the system 200 illustrated in FIG. 2, or any other type of information handling system operable to employ all, or portions of, the method of FIG. 3. Additionally, the method can be embodied in various types of encoded logic including software, firmware, hardware, or other forms of digital storage mediums, computer readable mediums or logic, or any combination thereof, operable to provide all, or portions, of the method of FIG. 3.

The method begins generally at block 300 when a request to order a product or group of products is input by a user. For example, a user can utilize a planning tool or other type of application within a user interface to select one or more products to purchase. Upon receiving the input, the method can proceed to block 302 and access system configuration data or information from an existing site such as a data center. In one form, one or more components installed at a site can include attributes stored within a memory device of the component an associated system. In another form, a database or other type of file including attributes for each component installed at an end user's site can be saved and accessed.

At block 304, the system configuration data or attributes can be communicated to a power calculator application 304 operable to calculate power that may be consumed. Upon calculating power for the exiting system, the method can proceed to block 306 and a thermal data output can be determined using the system configuration data for the end user's site. The method can then proceed to block 308 and an order system database can be accessed to determine system configuration data for a system to be ordered. For example, a system can be configured with various components having specific operating parameters, attributes, and the like. As one or more products are obtained and combined, the attributes of a purchase order can be combined with an existing system. The method can then proceed to block 310 and a thermal model can be generated using the system configuration data for the ordered system. In one form, the system configuration attributes for the ordered system can be combined with the system configuration data for a site. However, in other embodiments, separate thermal data outputs can be provided.

The method can then proceed to block 312 and the thermal data outputs can be input to a CFD application or processor operable to determine an environmental operational analysis such as a CFD model or CFD analysis. In one form, the method can determine a format to output the thermal data output. However, in other forms the thermal data output can be output using a user specified file format as desired. The method then proceeds to block 314 and a simulated CFD model can be determined. Upon generating a CFD model or analysis for the site based on a purchase order, the method can proceed to block 316, and output the CFD model or analysis to a user. For example, the output can be provided within a user interface associated with a planning tool or other type of tool that can be used by an end user to assist with purchasing a product.

In one form, a static CFD model can be output using static attribute values. For example, a static CFD model can include attributes such as size values, constant airflow values, heat values, power values, or other attribute values. In another form, a dynamic CFD model can be provided that includes one or more variables that can be modified. For example, a CFD model primitive can include a static attribute such as size. Additionally, one or more variables or variable attributes that are altered over a range can be used within a CFD model. For example, a CFD model primitive can include variables for heat, power, airflow, etc. that can be used. As such, a dynamic CFD model can be generated. For example, the variable attributes such as heat and power can be varied within a CFD model, and in one form, an inlet temperature variable can be adjusted as the CFD model converges on a final solution. As such, a dynamic CFD model can be determined through using both static and variable attributes for a specific system.

The method then proceeds to block 318 and a user can accept the selected order based on the CFD analysis provided. For example, if the CFD analysis resulted in an undesirable operating environment and the order is not desired, the method can proceed to block 328, and a user can modify the order. If the user elects to modify the order, the method can proceed to block 330, and the user can select different products to be purchased. In one form, the method can be modified to suggest a product or group of products based on the undesirable CFD analysis. Upon changing the order at block 330, the method can proceed to block 300, and proceed to determine a CFD analysis for the updated order. If at block 328, a user elects not to update the order, the method can proceed to block 326 and end.

At block 318, if a user accepts the order, the method can proceed to block 320 and the order can be saved or placed. At block 322, the CFD model or analysis can be saved for the purchase, and at block 324, the system configuration data and attributes for the end user's site or data center can be updated to include the purchased system. The method can then proceed to block 326 and end. As such, through determining an environmental impact one or more servers, devices, components, etc. can have using a CFD model or analysis prior to purchasing, dynamic modeling of an end user's site or data center can be determined prior to installation of the purchase order thereby reducing trial and error acquisitions for servers, devices, components, etc. for end user's sites and data centers.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving a first input indicative of a request to purchase a first system;
   accessing first configuration information in response to the first input, the first configuration information associated with the first system;
   accessing second configuration information in response to the first input, the second configuration information associated with an existing data center;
   generating a first thermal information output based on the first configuration information and the second configuration information; and
   using the first thermal information output to determine an environmental operational analysis.

2. The method of claim 1, wherein:
   accessing first configuration information comprises accessing an order system database to determine the first configuration information; and
   accessing second configuration information comprises accessing a site database to determine the second configuration information.

3. The method of claim 1, further comprising:
   communicating the environmental operational analysis in response to the first input; and
   receiving a second input in response to communicating the environmental operational analysis.

4. The method of claim 1, further comprising:
   communicating the first configuration information to a power calculation application; and
   determining the first thermal information output using the power calculation application.

5. The method of claim 1, further comprising:
   reading a first attribute of a first component of the system;
   determining a power consumption value of the first component using the first attribute;
   reading a second attribute of a second component of the system;
   determining a second power consumption value of the second component using the second attribute;
   combining the first power consumption value with the second power consumption value; and
   generating the first thermal information output based on the combining.

6. The method of claim 1, further comprising:
   reading a first temperature attribute of a first component of the system;
   reading a first dimensional attribute of the first component; and
   determining the environmental operational analysis using the first temperature attribute and the first dimensional attribute.

7. The method of claim 6, further comprising:
accessing a second temperature attribute of a second component of the site;
accessing a second dimensional attribute of the second component of the site; and
determining the first thermal information output using the first temperature attribute, the second temperature attribute, the first dimensional attribute, and the second dimensional attribute.

8. The method of claim 1, wherein the environmental operational analysis includes a computational fluid dynamic (CFD) analysis.

9. The method of claim 1, further comprising:
receiving an input to order the system in response to determining the CFD analysis; and
updating an order database to include a reference to the system in response to the input.

10. A environmental operational analysis enabled ordering system comprising:
a thermal attribute source operably associated with an order system source for an existing data center; and a thermal management processor operable to receive an input from a power consumption application and a environmental operational analysis modeling source, the thermal management processor further operable to output a representation of an environmental operational analysis in response to a request to purchase a first system.

11. The system of claim 10, further comprising the thermal management processor operable to receive configuration information of a site.

12. The system of claim 10, wherein the thermal attribute source is operable to include a geometric attribute associated with a component of the order system source.

13. The system of claim 12, further comprising a power calculation application operable to calculate power consumption of the component.

14. The system of claim 10, wherein the environmental operational analysis is determined using site configuration information.

15. The system of claim 10, wherein the thermal management processor is operable to output a plurality of file formats operable to be used by the environmental operational modeling source.

16. An information handling system comprising:
a planning tool operable to enable selection of a system for use at a site, the planning tool including an order system source configured to receive a request to purchase the system;
a thermal management processor operably coupled to the planning tool, the thermal management processor including:
an input operable to receive an attribute of a component of the system;
an output operable to output information operable to be used to determine a computational fluid dynamic (CFD) analysis; and
a CFD analysis input source operable to receive a CFD analysis to be presented in connection with the planning tool.

17. The information handling system of claim 16, further comprising:
a site input source operable to receive a second attribute of a second component located at a site; and
a thermal information source operably associated with an order system source of the planning tool, the thermal information source including the attribute information of the component.

18. The information handling system of claim 17, further comprising a power consumption application operable to determine a power consumption using the first attribute and the second attribute.

19. The method of claim 3, further comprising:
determining the second input is indicative of a request to decline a purchase of the first system.

20. The method of claim 19, further comprising:
receiving a third input indicative of a request to purchase a second system after receiving the second input;
accessing third configuration information in response to the third input, the third configuration information associated with the third system;
accessing the second configuration information;
generating a second thermal information output based on the third configuration information and the second configuration information; and
using the second thermal information output to determine a second environmental operational analysis.

* * * * *